(12) United States Patent
Valero et al.

(10) Patent No.: US 6,459,993 B1
(45) Date of Patent: Oct. 1, 2002

(54) PROCESSING SONIC WAVEFORM MEASUREMENTS FROM ARRAY BOREHOLE LOGGING TOOLS

(75) Inventors: Henri-Pierre Valero, Machida (JP); Alain Brie, Tokyo (JP); Kai Hsu, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 09/678,454

(22) Filed: Oct. 3, 2000

(30) Foreign Application Priority Data

Oct. 6, 1999 (GB) .............................................. 9923461

(51) Int. Cl.[7] ................................................ G01V 1/28
(52) U.S. Cl. ........................................ 702/14; 702/17
(58) Field of Search ..................................... 702/14, 17

(56) References Cited

U.S. PATENT DOCUMENTS 4,543,648 A   9/1985   Hsu

FOREIGN PATENT DOCUMENTS

| GB | 1582714 B | 1/1981 |
|----|-----------|--------|
| GB | 2334104 A | 8/1999 |
| WO | WO 00/62101 | 10/2000 |

OTHER PUBLICATIONS

Kimball C.V. and Marzetta T.L., "Semblance processing of borehole acoustic array data" Geophysics, vol. 49, No. 3 (Mar. 1984); pp. 274–281.

Hsu, K. and Chang, S.K., "Multiple-shot processing of array sonic waveforms" Geophysics, vol. 52, No. 10 (Oct. 1987); pp. 1376–1390.

Valero, Dr. Henri-Pierre, Hsu, Dr. Kai and Brie, Mr. Alain, 2000, Multiple-shot processing in slowness and time domain of array sonic waveforms, 70th Ann. Internat. Mtg: Soc. Of Expl. Geophys., Session: RPB 1.3, Calgary.

Zhang, Dr. Tianrun and Tang, Dr. Xiaoming, 2000, Waveform inversion of array acoustic log data for high-resolution formation slowness estimation, 70th Ann. Internat. Mtg: Soc. Of Expl. Geophys., Session: RPB 1.2, Calgary.

*Primary Examiner*—Edward Lefkowitz
*Assistant Examiner*—Anthony Gutierrez
(74) *Attorney, Agent, or Firm*—Robin Nava; Victor Segura; Brigitte Jeffery

(57) ABSTRACT

Methods for processing sonic logging data obtained from a logging tool having an array of R receivers, includes selecting a sub-array size of $R_{sb}$ receivers where $R_{sb}<R$; calculating the number of sub-arrays $N_{sb}$ possible from the array of R receivers; identifying one receiver $R_{ref}$ in the array to serve as a reference receiver for each sub-array; processing data in the slowness-time plane for each sub-array with respect to the reference receiver $R_{ref}$; and stacking the processed data in the slowness-time plane for all sub-arrays.

19 Claims, 4 Drawing Sheets

PROCESSING SONIC WAVEFORM MEASUREMENTS FROM ARRAY BOREHOLE LOGGING TOOLS

TECHNICAL FIELD

The present invention relates to methods for processing sonic waveform measurements, particularly sonic waveform measurements made for the purpose of characterising properties of underground formations. The invention in particular relates to methods for processing sonic measurements made with array tools.

BACKGROUND ART

Sonic logging tools for use in characterising underground formations surrounding a borehole by measuring the effect of the formation on a sonic signal propagating through it are well known. Such tools commonly include an array of transducers, commonly receivers in order to improve the sensitivity and accuracy of the measurements made. One example of an array tool for use in a borehole for sonic measurements is the DSI tool of Schlumberger which is shown schematically in FIG. 1. The DSI tool comprises a transmitter section 10 having a pair of (upper and lower) dipole sources 12 arranged orthogonally in the radial plane and a monopole source 14. A sonic isolation joint 16 connects the transmitter section 10 to a receiver section 18 which contains an array of eight spaced receiver stations, each containing two hydrophone pairs, one oriented in line with one of the dipole sources, the other with the orthogonal source. An electronics cartridge 20 is connected at the top of the receiver section 18 and allows communication between the tool and a control unit 22 located at the surface via an electric cable 24. With such a tool it is possible to make both monopole and dipole measurements. The DSI tool has several data acquisition operating modes, any of which may be combined to acquire (digitised) waveforms. The modes are: upper and lower dipole modes (UDP, LDP)—waveforms recorded from receiver pairs aligned with the respective dipole source used to generate the signal; crossed dipole mode—waveforms recorded from each receiver pair for firings of the in-line and crossed dipole source; Stoneley mode—monopole waveforms from low frequency firing of the monopole source; P and S mode (P&S)—monopole waveforms from high frequency firing of the monpole transmitter; and first motion mode—monopole threshold crossing data from high frequency firing of the monopole source.

One way to determine compressional, shear and Stoneley slownesses from these measurements is to use slowness-time-coherence (STC) processing. STC processing is a full waveform analysis technique which aims to find all propagating waves in the composite waveform. The processing adopts a semblance algorithm to detect arrivals that are coherent across the array of receivers and estimates their slowness. The basic algorithm advances a fixed-length time window across the waveforms in small, overlapping steps through a range of potential arrival times. For each time position, the window position is moved out linearly in time, across the array of receiver waveforms, beginning with a moveout corresponding to the fastest wave expected and stepping to the slowest wave expected. For each moveout, a coherence function is computed to measure the similarity of the waves within the window. When the window time and the moveout correspond to the arrival time and slowness of a particular component, the waveforms within the window are almost identical, yielding a high value of coherence. In this way, the set of waveforms from the array is examined over a range of possible arrival times and slownesses for wave components. STC processing produces coherence (semblance) contour plots in the slowness/arrival time plane. Regions of large coherence correspond to particular arrivals in the waveforms. The slowness and arrival time at each coherence peak are compared with the propagation characteristics expected of the arrivals being sought and the ones that best agree with these characteristics are retained. Classifying the arrivals in this manner produces a continuous log of slowness versus depth. For dispersive waves, the STC processing is modified to take into account the effect of frequency. As the output of STC processing is a coherence plot, the coherence of each arrival can be used as a quality indicator, higher values implying greater measurement repeatability. When processing dipole waveforms, one of the coherence peak will correspond to the flexural mode but with a slowness that is always greater (slower) than the true shear slowness. A precomputed correction is used to remove this bias. Further details of STC processing can be found in Kimball C. V. and Marzetta T. L., "*Semblance processing of borehole acoustic array data*" Geophysics, Vol. 49, No. 3 (March 1984); pp 274–281.

To compensate for variations in measurements due to the borehole rather than due to the formation a series of measurements are made across an interval in which the formation properties are expected to vary little, if at all. In its simplest form, the interval corresponds to the extent of the receiver array, and the waveforms at each receiver station measured for a given firing of a source ("receiver array" or "receiver mode" or "Rec."). In simple STC processing, all receiver stations are considered. In multishot STC processing (MSTC), sub-arrays of receiver stations within the receiver array are considered, for example a sub-array of five receiver stations in a receiver array of eight receiver stations (other numbers or receiver stations in the sub-array can be used depending on requirements). In this case, the same formation interval corresponding to the extent of a five receiver station sub-array can be measured several times as the tool is logged through the borehole, the five stations making up the sub-array being selected at each source firing to measure the same formation interval. Another approach, known as "transmitter mode" or "pseudo-transmitter array" ("Tra.") takes waveforms from sequential source firings as the transmitter passes along the interval to be measured. In order to compensate for the movement of the tool between measurements, an effectively stationary receiver station or sub-array must be used. This can be achieved by changing the receiver station considered so that its position in the borehole is effectively stationary as the transmitter is moved through the interval. Borehole compensation ("BHC") can be achieved for P and S mode results by processing receiver array and pseudo-transmitter array waveforms and averaging the results. A schematic example of an eight receiver array tool making measurements in across a depth interval five receivers in length for successive firings of a transmitter is shown in FIG. 2. By using the five receiver sub-array, four measurements are made of the same depth interval with the transmitter in positions i, i+1, i+2 and i+3. STC processing of each sub-array produces a series of slowness time plots as shown in FIG. 3(a). If it is desired to combine the information obtained from this series of transmitter firings, it is necessary to deal with the time shift between each sub-array due to the movement of the source. Previously this has been achieved by projecting each slowness time plot onto the slowness axis (FIG. 3(b)) followed by stacking the four plots into one (FIG. 3(c)). Further details of this approach can be found in Hsu, K. and Chang, S. K., *"Multiple-shot processing of array sonic waveforms"* Geophysics, Vol. 52, No. 10 (October 1987); pp 1376–1390. It will be appreciated that collapsing the separate ST plots onto the slowness axis gives up useful information derived from the time axis of each plot. U.S. Pat. No. 4,543,648 also describes methods of shot to shot processing of sonic waveforms.

DISCLOSURE OF INVENTION

This invention provides methods for processing sonic logging data obtained from a logging tool having an array of R receivers, comprising:

selecting a sub-array size of $R_{sb}$ receivers where $R_{sb} < R$;

calculating the number of sub-arrays $N_{sb}$ possible from the array of R receivers;

identifying one receiver $R_{ref}$ in the array to serve as a reference receiver for each sub-array;

processing data in the slowness-time plane for each sub-array with respect to the reference receiver $R_{ref}$, and stacking the processed data in the slowness-time plane for all sub-arrays.

Stacking can be achieved using algebraic or geometric summation, an algebraic mean being preferred.

Processing in the slowness time plane can comprise stacking slowness-time coherences for each sub-array, or processing data to obtain stacks comprising the coherent energy and total energy in the slowness time plane for the sub-arrays and then obtaining the ratio of the two to derive the stacked slowness-time coherence data.

It is preferred to use the maximum number of sub-arrays possible for a given array receiver in order to maximise the amount of information obtained from the formation. For an array of R (sometimes given below as $N_{rcvr}$)receivers, the maximum number of sub-arrays $N_{sb}$, of $R_{sb}$ receivers in length, is given by $$N_{sb} = R - R_{sb} + 1. \quad (1)$$

For an eight receiver array tool, a five receiver sub-array size allows four sets of waveforms to be recorded for a given depth.

Identification of the traces (waveforms) to be recorded can be achieved by computing a geometric matrix G of dimensions $N_{sb}$ by $R_{sb}$, which gives the receivers to be considered at each shot at a given depth. Identification of which traces from the whole array for each shot can be achieved by computing a multiple-shot matrix M of dimensions $$N_{sb}, N_{rcvr} + N_{sb} - 1. \quad (2)$$

Traces not considered from a given shot are assigned a 0 values in such a matrix.

The reference receiver $r_{ref}$ for a set of sub-arrays is identified from the relationship (1), where $N_{sb}$ also identifies the position of the reference receiver $r_{ref}$ in the array.

BEST MODE FOR CARRYING OUT THE INVENTION

The invention will be described by way of example with reference to an eight receiver array (DSI-type tool) using sub-arrays of five receivers in length. It will be appreciated that the number of receivers in the array can be different depending on the type of tool used. In this description, the terms "receiver" is used to relates to single sensors (e.g. hydrophones) or to a station with a number of sensors disposed around the circumference of the tool at a number of levels (e.g. four hydrophones at each receiver station). Also, the number of receivers in each sub-array is selected by the user. The smallest sub-array is three receivers since slowness-time plane processing requires the use of pairs of arrival time measurements, typically from adjacent pairs of receivers. The size of the sub-array determines the resolution of the slowness determination ultimately made, the smaller the array, the thinner the bed that can be measured. For a tool with a 6" receiver spacing, this means that an eight receiver tool can measure between 1' and 3.5' depth intervals.

General descriptions of the acquisition and processing techniques applicable to this invention can be found in UK Patent Application No. 9907620.0 and in U.S. Pat. Nos. 4,809,236, 5,278,805 and 5,594,706.

The processing of the present invention attempts to improve the resolution of the typical dispersive STC (DSTC) full array calculation by processing results from sub-arrays and oversampling the interval of interest. While this reduces the amount of data available from each sub-array, the fact that the tool has multiple opportunities to sample the region with different sub-arrays of the same size means that this can be compensated in the redundancy of the data obtained by stacking the ST planes.

The general processing methodology of the present invention is as follows:

For the case of multiple shots at depth $Z_n$:

$A_i$ is the waveform input to STC processing.

i is the number of a sub-arrays (i=1, N).

$F_i$ is the ST plane computed for the sub-array i.

A frame is represented as a function of two parameters: $F_i = F_i(t,S)$ where t is the time and S the slowness. For N sub-arrays, N=1, 5 for example, five frames $F = \{F_1, F_2, F_3, F_4, F_5\}$ are obtained where F is the family of frames at depth Z.

The object of the multiple shot technique is to compute $$F_{stack} = \sum_{i=1}^{N} F_i \quad (3)$$

But as there is a shift in time between two consecutive frames, it is necessary to take into account this time shift prior to stacking the ST planes.

Figure 1:
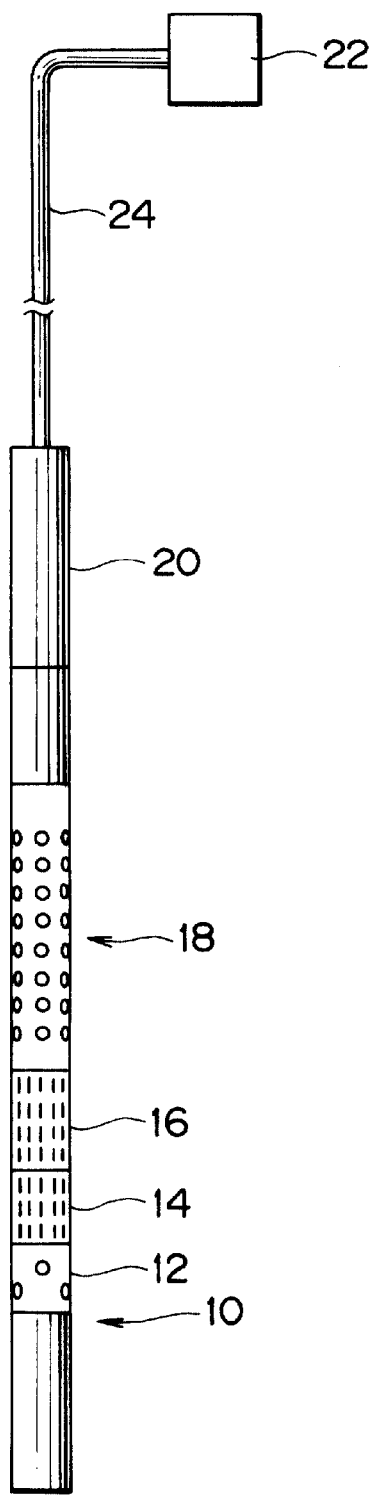
FIG. 1 shows a prior art sonic logging tool.
Figure 2:
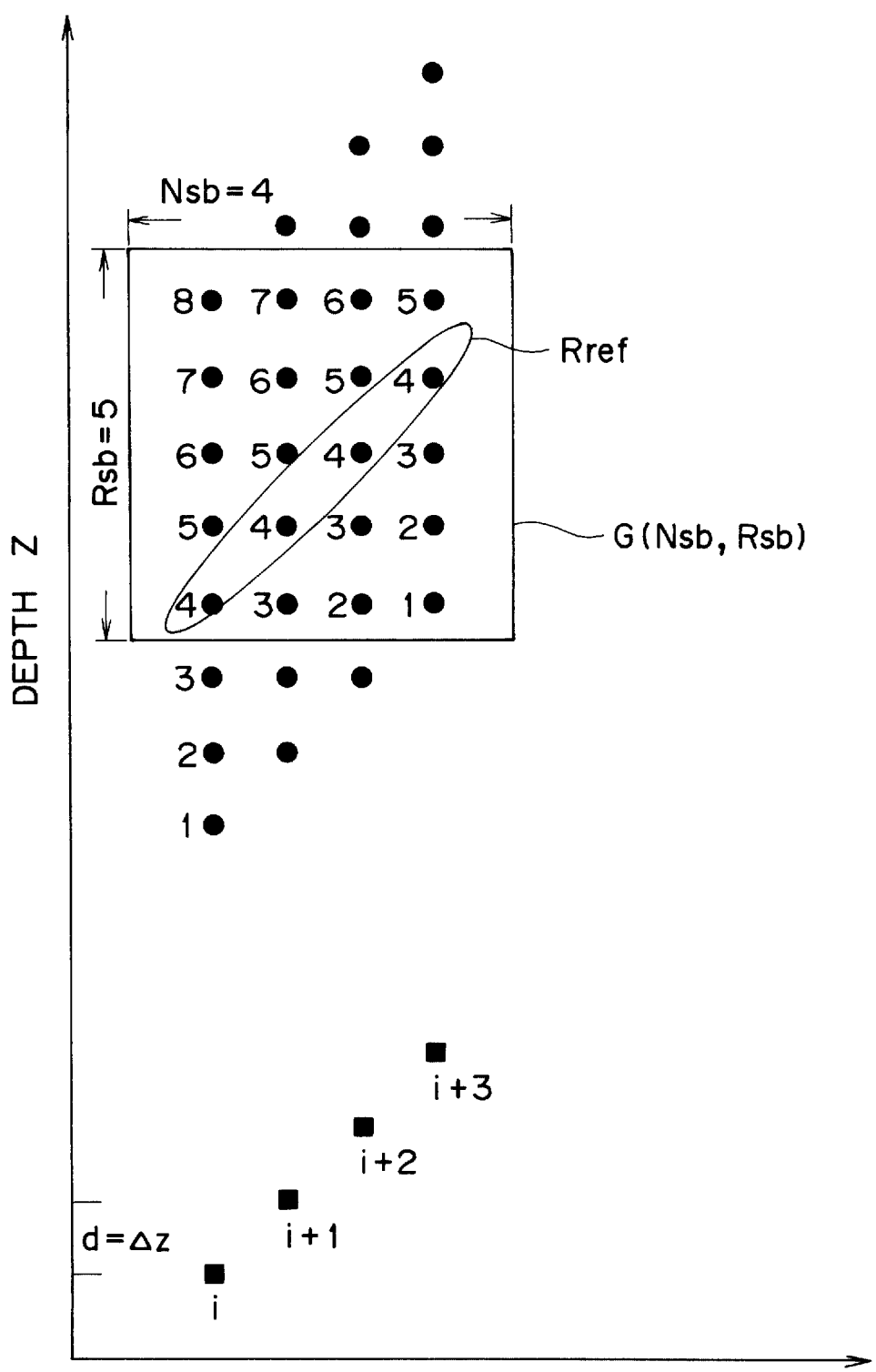
FIG. 2 shows a schematic diagram of a multi-shot measurement of a borehole region.
Figure 3A:
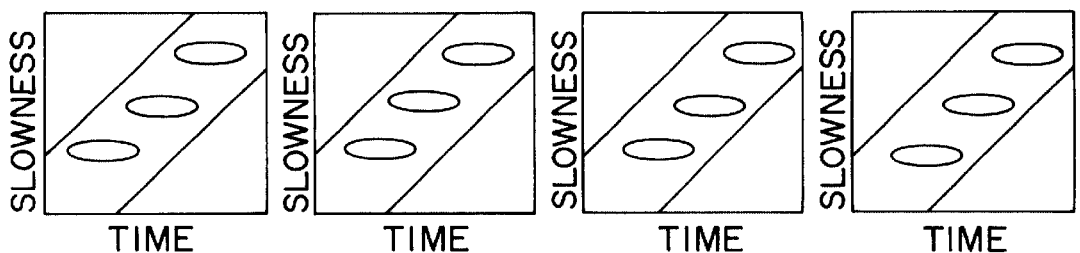
FIGS. 3(a)–(c) show plot illustrating a prior art processing scheme.
Figure 3B:
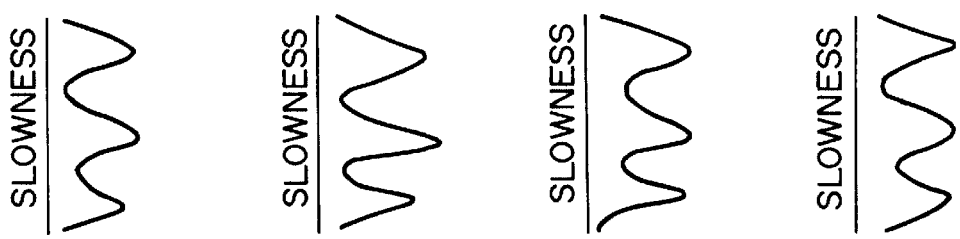
Figure 3C:

Between frame $F_i$, and $F_{i-1}$, the tool moves a known distance $d=\Delta z$ (see FIG. 2). This distance d is known. The motion of the tool between consecutive shots means that there is a time shift between the different sub-arrays. For a frame $F_i(t, S)$ and a point $A(t_i, S_i)$ located in this ST plane, to shift this point in time, it is necessary to shift it by the value:

$$tt_i = t_i - d \cdot S(t_i). \quad (4)$$

For all of the frame, after time shift, this gives:

$$F'_i(t,S) = F_i(t - (i-1)d \cdot S(t), S). \quad (5)$$

This equation, called the time shift equation, gives the relationship between a frame of data before and after time correction. Knowing how to correct this time shift makes it possible to define a general equation of the multiple shot processing technique.

Starting with equation (5) above, it is possible to rewrite it as a general equation:

$$F'_i(t,S) = F_i(t,S) * \delta(t-(i-1)d \cdot S(t),S) \quad (6)$$

where * is the convolution operator on the variable t. To resample the frame to stack it with others, the shah function is used, defined as:

$$shah(t) \equiv \sum_{n=-\infty}^{+\infty} \delta(t-n). \quad (7)$$

For a signal s(t) it is possible to rewrite this signal as:

$$s_\tau(t) = s(t) \, shah\left(\frac{t}{\tau}\right). \quad (8)$$

Thus the signal s(t) is discretised with a sampling rate τ.

Rewriting the equation of a frame shifted in time and after resampling gives:

$$F'_{i,\tau}(t, S) = F'_i(t, S) shah\left(\frac{t}{\tau}\right). \quad (9)$$

Rearranging equation (9) gives:

$$F'_{i,\tau}(t, S) = F'_i(t, S) shah\left(\frac{t}{\tau}\right) \quad (10)$$

$$= [F_i(t, S) * \delta(t - (i-1)d \cdot S(t))] \, shah\left(\frac{t}{\tau}\right)$$

$$= |\tau| \sum_{n=-\infty}^{+\infty} [F_i(t, S) * \delta(t - (i-1)d \cdot S(t))] \, \delta(t - n\tau)$$

This defines the transformation to be applied on each frame before stacking.

Knowing the transformation that it is necessary to apply on a frame i, it is possible to write the general equation of multi-shot processing. For a given level Z, this is:

$$F_{stack} = F_1(t, S) + \sum_{i=2}^{N} \sum_{n=-\infty}^{+\infty} |\tau|[F_i(t, S) * \delta(t - (i-1)d \cdot S(t))]\delta(t - n\tau). \quad (11)$$

The portion δ(t−(i−1)d·S(t)) is the time shift operation. As this is the part that is most expensive in CPU time, it is optimised using an optimal time shift operator derived in the following manner:

In general the timeshift operator can be decomposed into two parts:

$$Z^a = Z^n + Z^\alpha$$

where n=[a](:integer part) and α=a−n(|α|≦1:real or fraction part).

$Z^n$ can be obtained by simple resampling. There are many ways to shift data by α samples. An operation of the phase shift in the frequency domain is one possibility. However, when data is in the time domain it can be costly to transform the data from time to frequency domain and back again at the end. The process here proposes a standard convolution using a truncated operator. Any time series can be expressed as:

$$x(t) = \int_{-\infty}^{\infty} x(t-\tau)\delta(\tau)d\tau$$

Therefore a shift being applied to the time series is equivalent to applying a shift with a sign change to the δ function.

For a time series of four samples, for example, the operators for the fast forward Fourier Transform, the timeshift and backward transform can be expressed in the matrix form:

i) The forward Fourier transform:

$$\begin{pmatrix} 1 & 1 & 1 & 1 \\ 1 & i & -1 & -i \\ 1 & -1 & 1 & -1 \\ 1 & -i & -1 & i \end{pmatrix}$$

ii) The timeshift operators in the frequency domain:

$$\begin{pmatrix} 1 & 0 & 0 & 0 \\ 0 & e^{i\theta} & 0 & 0 \\ 0 & 0 & e^{2i\theta} & 0 \\ 0 & 0 & 0 & e^{-i\theta} \end{pmatrix}$$

where θ=πα/2.

iii) The inverse Fourier transform operator:

$$\frac{1}{4}\begin{pmatrix} 1 & 1 & 1 & 1 \\ 1 & -i & -1 & i \\ 1 & -1 & - & -1 \\ 1 & i & -1 & -i \end{pmatrix}$$

Application of these operators to the delta function yields:

$$TS(\alpha) = Z^a$$

$$= \frac{1}{2}\begin{pmatrix} (\sin^2\theta = \sin\theta)Z^{-1} + (\cos^2\theta + \cos\theta) + \\ (\sin^2\theta - \sin\theta)Z + (\cos^2\theta - \cos\theta)Z^2 \end{pmatrix}$$

Equation (11) is the general multi-shot equation which makes no assumption of the tool used but does assume a homogenous medium. To avoid the problem of high computation time for resampling in time and time shift while executing the general method, the present invention takes advantage of the fact that the receiver spacing and the tool motion of one depth increment are the same to compute the time shift during the processing of an ST plane for each sub-array.

In the present case, the reference receiver of each sub-array is changed before computing the semblance of this sub-array to take into account the movement of the tool and time shift. The preferred approach is to use as a reference the first receiver of the first sub array, the second receiver of the second sub-array and so on. Each time the semblance for each of these sub-arrays is computed. This takes into account the time shift between the different sub-arrays, so it is possible to stack the semblances immediately after computation, the time shift between the different sub-arrays being taken into account. It will be appreciated that the effect of changing the reference receiver in this way has the effect of using the output of just one receiver as the reference for each shot (since that receiver changes its position in the sub-array as the tool progresses along the borehole). In the example of FIG. 2, receiver 4 is the reference receiver.

After the time shift correction has been made, and the semblance for each sub-array computed, it is necessary to stack the ST planes. This can be achieved using an algebraic mean or a geometric mean.

The algebraic mean can be computed as follows:

$$F(S, t) = \frac{1}{N} \sum_{i=1}^{N} F_i(S, t) \qquad (12)$$

where $F_i$ is the ST plane computed for one sub-array, and N is the number of sub-arrays used to compute the final multi-shot result.

The geometric mean can be computed as follows:

$$F(S, t) = \sqrt[N]{\prod_{i=1}^{N} Fi(S, t)}. \qquad (13)$$

Since the effect of one poor ST plane is less if the algebraic mean is used rather than the geometric mean, the algebraic mean is the preferred form of stacking.

There are two alternative ways to compute the final multi-shot result. An ST plane semblance map is defined as the ratio between coherent energy Ci(S,t) and total energy Ti(S,t), therefore $$Fi(S, t) = \frac{1}{N_{rcvr}} \frac{Ci(S, t)}{Ti(S, t)}. \qquad (14)$$

It is possible to compute the final ST plane by computing the final multiple-shot ST plane according to equation 12, or by first stacking the coherent energy and the total energy separately and afterwards computing the final multiple-shot as the ration between the stack of the coherent energy and the total energy. In the second technique, the following is computed:

$$F(S, t) = \frac{\frac{1}{N} \sum_{i=1}^{N} Ci(S, t)}{\frac{1}{N} \sum_{i=1}^{N} Ti(S, t)} = \frac{\sum_{i=1}^{N} Ci(S, t)}{\sum_{i=1}^{N} Ti(S, t)}. \qquad (15)$$

Comparison of results between the two methods has not shown significant difference in the accuracy of the result and the former method is preferred as it is easier to implement with the STC methods currently in use.

Efficient processing of multi-shot data requires that the following be determined:
1. The number of sub-arrays used to compute the multi-shot.
2. Identification of the input traces required for each sub-array comprising the multiple-shot result at a given depth.
3. Automatic selection of the reference receiver for each sub-array depending on the configuration used.

For a tool with R receivers, $R_{sb}$ is the number of receivers in a sub-array. This number is selected by the user and is linked to the resolution to be obtained. By definition, its lower limit is 3. The number does not change the actual processing, just the physical interpretation of the result of the processing. $N_{sb}$ is the maximum number of sub-arrays used to compute the multi-shot. This value is equal to the number of measurement depths through which the tool is moved to make the multi-shot measurements and can be defined as:

$$N_{sb}R - R_{sb} + 1. \qquad (16)$$

In order to know which receivers it is necessary to use to compute the multi-shot, a "geometric matrix" is implemented. When computing a multi-shot, it is necessary to change the reference receiver for each sub-array when computing the ST plane to take into account the time shift correction. For $N_{sb}$, sub-arrays of $R_{sb}$, receivers, the geometric matrix has dimensions $G = G(N_{sb}, R_{sb})$ and is defined as:

$$G = \begin{pmatrix} r_{n+R_{sb}-1} & r_{n+R_{sb}-2} & \cdots & r_{n+1} \\ r_{n+R_{sb}-2} & r_{n+R_{sb}-3} & \cdots & r_n \\ \vdots & \vdots & \ddots & \vdots \\ r_n & r_{n-1} & \cdots & r_{n-N_{sb}+1} \end{pmatrix} \qquad (17)$$

The first receiver of the first sub-array $r_n$ is equal to the value of sub-array necessary to compute the multi-shot. Therefore, $r_n = N_{sb}$, the second receiver of this sub-array is $r_{n+1}$ and so on. Each column of the matrix can be computed as:

$$r_i = r_n = i, \; i = 0, R_{sb},$$

Where i is the number of the receiver inside the sub-array. The reference receiver is always the same as the first receiver of the first sub-array. Thus if this value is computed at the beginning of the calculation, all of the parameters for the STC processing are fixed for this computation and it is not necessary to redefine the reference receiver for each sub-array. Furthermore, the geometric matrix allows easy identification at each frame the receivers that are activated and deactivated at that depth. Consequently, it is merely necessary to multiply the receiver status by the current vector to know which receivers are to be used, thus simplifying data management. All that is needed is to know whether or not a receiver is active for a given frame, since data from all receivers is calculated at the beginning and the results used by circular permutation of the column of the matrix for each new frame. In the example of FIG. 2, the geometric matrix is as follows:

$$G = \begin{pmatrix} 8 & 7 & 6 & 5 \\ 7 & 6 & 5 & 4 \\ 6 & 5 & 4 & 3 \\ 5 & 4 & 3 & 2 \\ 4 & 3 & 2 & 1 \end{pmatrix} \qquad (18)$$

Receiver number 4 is the reference receiver for each sub-array

The multiple-shot matrix M extends this concept to identify the contribution from each receiver in the tool array to the multiple-shot result. This matrix has the dimensions $M(N_{sb}, N_{rcvr} + N_{sb} - 1)$ as shown in equation 19 below:

$$M = \begin{pmatrix} 0 & 0 & 0 & r_{max} \\ \vdots & \cdots & r_{max} & \vdots \\ 0 & r_{max} & \vdots & \vdots \\ r_{max} & \vdots & \cdots & \vdots \\ \vdots & \vdots & \ddots & \vdots \\ r_{ref}+N_{sb}+1 & r_{ref}+N_{sb} & \cdots & r_{ref}+2 \\ r_{ref}+N_{sb} & r_{ref}+N_{sb}-1 & \cdots & r_{ref}+1 \\ r_{ref}+N_{sb} & r_{ref}+N_{sb}-2 & \cdots & r_{ref} \\ \vdots & \vdots & \ddots & \vdots \\ r_{ref} & r_{ref}-1 & \cdots & r_{ref}-N_{sb}+1 \\ r_{ref}-1 & r_{ref}-2 & \cdots & r_{ref}-N_{sb}+1 \\ r_{ref}-2 & r_{n-1} & \cdots & r_{ref}-N_{sb}+1 \\ \vdots & \vdots & \vdots & r_{min} \\ \vdots & \cdots & r_{min} & 0 \\ \vdots & r_{min} & 0 & 0 \\ r_{min} & 0 & 0 & 0 \end{pmatrix} \quad (19)$$

Each column of this matrix represents one position of the tool versus depth and rmin is the nearest receiver to the transmitter and rmax is the furthest. Each element of the matrix becomes 1 when it is necessary to use the waveform recorded by the relevant receiver and 0 if not. Knowing this matrix allows easy identification of the receiver traces required and so assists in data management. It is also possible to know from this matrix which sub-arrays are dependent on each receiver trace.

The geometric matrix and the multi-shot matrix are computed once at the beginning of the processing and during the processing the input data are shifted before performing each computation.

Figure 4:
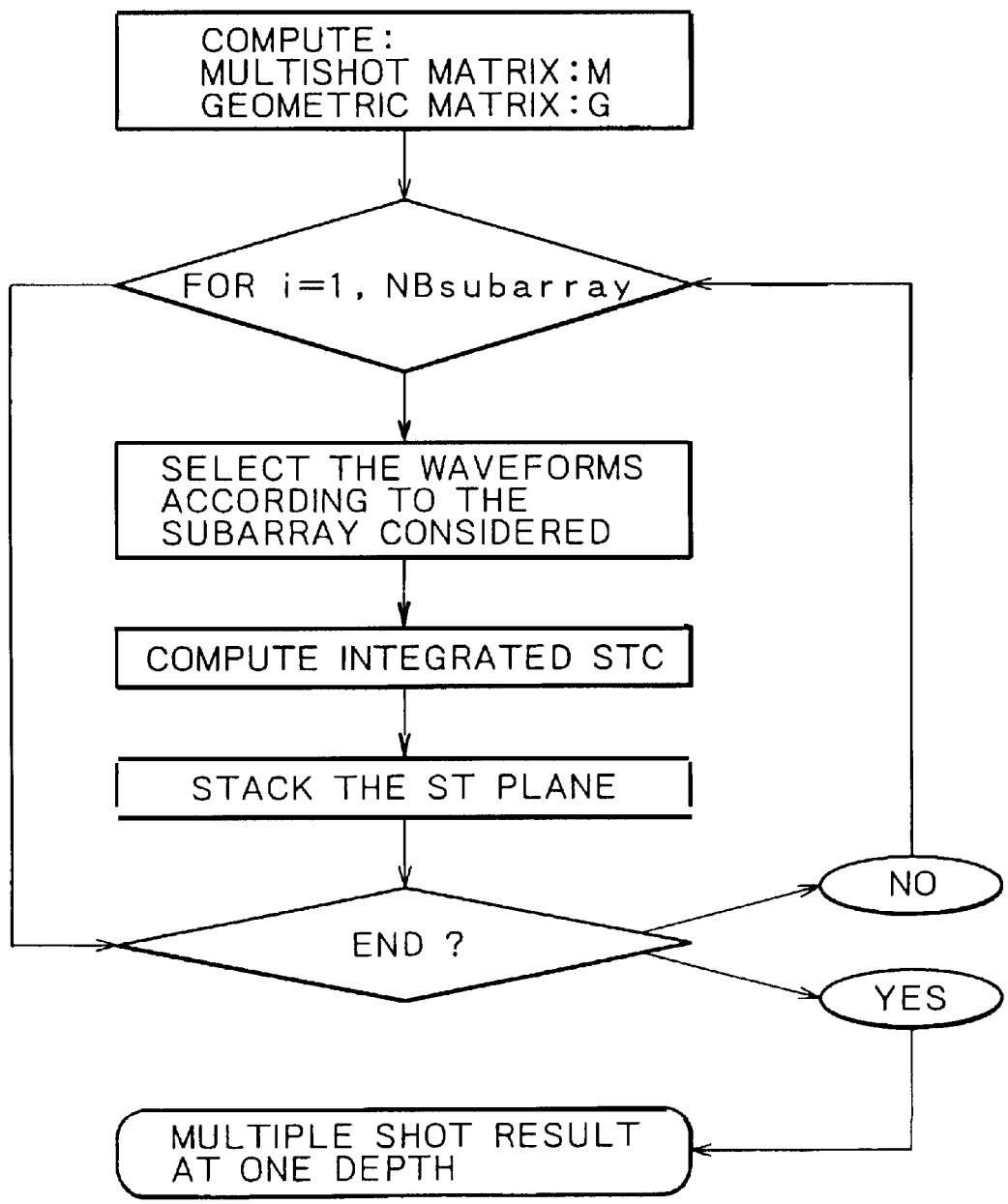
FIG. 4 shows a flow chart with major processing steps of a method according to the invention.

FIG. 4 shows a flow chart of the basic steps of a method according to the invention as described above.

INDUSTRIAL APPLICABILITY

The present invention finds application in the field of characterising underground formations surrounding borehole such as in the oil and gas industry.

What is claimed is:

1. A method for processing sonic logging data obtained from a logging tool having an array of R receivers, comprising:
   (i) selecting a sub-array size of $R_{sb}$ receivers where $R_{sb}<R$;
   (ii) calculating the number of sub-arrays $N_{sb}$ possible from the array of R receivers;
   (iii) identifying one receiver $R_{ref}$ in the array to serve as a reference receiver for each sub-array;
   (iv) processing data in a slowness-time plane for each sub-array with respect to the reference receiver $R_{ref}$; and
   (v) stacking the processed data in the slowness-time plane for all sub-arrays.

2. A method as claimed in claim 1, wherein the stacking is accomplished using an algebraic mean or a geometric mean.

3. A method as claimed in claim 2, wherein the step of stacking comprises computing slowness-time coherence for each sub-array followed by stacking or computing coherent energy and total energy stacks for the sub-arrays used and obtaining the ratio to derive the stacked slowness-time data.

4. A method as claimed in claim 2, wherein $N_{sb}$ comprises the maximum number of sub-arrays possible from the array of R receivers according to:

$$N_{sb}=R-R_{sb}+1.$$

5. A method as claimed in claim 2, further comprising calculating a geometric matrix of dimensions $N_{sb}$ by $R_{sb}$ which identifies the particular receivers to be considered at each depth.

6. A method as claimed in claim 2, further comprising calculating a multi-shot matrix of dimensions $N_{sb}$ by $R+N_{sb}-1$ which identifies the contribution of each receiver in the tool to a given sub-array.

7. A method as claimed in claim 2, wherein the reference receiver $R_{ref}$ is identified by the relationship:

$$R_{ref}=R-R_{sb}+1$$

where $R_{ref}$ is the number of the reference receiver in the array.

8. A method as claimed claim 2, wherein the number of receivers in each sub-array is chosen to determine the resolution of the measurement.

9. A method as claimed in claim 1, wherein the step of stacking comprises computing slowness-time coherence for each sub-array followed by stacking or computing coherent energy and total energy stacks for the sub-arrays used and obtaining the ratio to derive the stacked slowness-time data.

10. A method as claimed in claim 9, wherein $N_{sb}$ comprises the maximum number of sub-arrays possible from the array of R receivers according to:

$$N_{sb}=R-R_{sb}+1.$$

11. A method as claimed in claim 9, further comprising calculating a geometric matrix of dimensions $N_{sb}$ by $R_{sb}$ which identifies the particular receivers to be considered at each depth.

12. A method as claimed in claim 9, further comprising calculating a multi-shot matrix of dimensions $N_{sb}$ by $R+N_{sb}-1$ which identifies the contribution of each receiver in the tool to a given sub-array.

13. A method as claimed in claim 9, wherein the reference receiver $R_{ref}$ is identified by the relationship:

$$R_{ref}=R-R_{sb}+1$$

where $R_{ref}$ is the number of the reference receiver in the array.

14. A method as claimed claim 9, wherein the number of receivers in each sub-array is chosen to determine the resolution of the measurement.

15. A method as claimed in claim 1, wherein $N_{sb}$ comprises the maximum number of sub-arrays possible from the array of R receivers according to:

$$N_{sb}=R-R_{sb}+1.$$

16. A method as claimed in claim 1, further comprising calculating a geometric matrix of dimensions $N_{sb}$ by $R_{sb}$ which identifies the particular receivers to be considered at each depth.

17. A method as claimed in claim 1, further comprising calculating a multi-shot matrix of dimensions $N_{sb}$ by $R+N_{sb}-1$ which identifies the contribution of each receiver in the tool to a given sub-array.

18. A method as claimed in claim 1, wherein the reference receiver $R_{ref}$ is identified by the relationship:

$$R_{ref}=R-R_{sb}+1$$

where $R_{ref}$ is the number of the reference receiver in the array.

19. A method as claimed claim 1, wherein the number of receivers in each sub-array is chosen to determine the resolution of the measurement.

* * * * *